(12) United States Patent
Soleimani et al.

(10) Patent No.: US 6,317,077 B1
(45) Date of Patent: Nov. 13, 2001

(54) METHOD AND SYSTEM OF DETERMINING USER TERMINAL POSITION USING MULTIPLE SATELLITES

(75) Inventors: Mohammad Soleimani, Rockville; Xiangdong Liu, Germantown, both of MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/510,921

(22) Filed: Feb. 22, 2000

Related U.S. Application Data

(60) Provisional application No. 60/121,115, filed on Feb. 22, 1999.

(51) Int. Cl.[7] ............................... H04B 7/185; G01S 5/02
(52) U.S. Cl. ..................... 342/357.05; 342/418
(58) Field of Search ................. 342/357.05, 418

(56) References Cited

U.S. PATENT DOCUMENTS

| | | | |
|---|---|---|---|
| 5,185,610 | * | 2/1993 | Ward et al. . |
| 5,859,874 | * | 1/1999 | Wiedeman et al. ................. 375/267 |
| 6,018,312 | * | 1/2000 | Haworth ............................. 342/353 |

* cited by examiner

Primary Examiner—Theodore M. Blum
(74) Attorney, Agent, or Firm—John T. Whelan; Michael W. Sales

(57) ABSTRACT

In a satellite communication system (20), a method (50) and system of locating terrestrial-based user terminals (UTs). A UT (23) is located by a two-tier estimation procedure. Under this procedure, an initial estimate of the UT location is performed based on absolute signal propagation delay and Doppler shift measured from a communication link between a satellite and the UT. A second, refined estimate of the UT location is then performed based on the results of the initial estimate. The second estimate can be a function of the absolute propagation delay and absolute Doppler, as well as differential delay and differential Doppler measured from transmissions from two or more satellites (21–22) to the UT (23).

9 Claims, 6 Drawing Sheets

O Earth Center
Q Sub-satellite point
$P_0$ Initial guess of UT position
P UT position

METHOD AND SYSTEM OF DETERMINING USER TERMINAL POSITION USING MULTIPLE SATELLITES

CROSS-REFERENCE TO RELATED APPLICATION

This application claims benefit of U.S. Provisional Application Number 60/121,115, filed Feb. 22, 1999.

TECHNICAL FIELD OF THE INVENTION

The present invention relates generally to position determination, and in particular, to an improved technique for determining the location of terrestrial-based user terminals using absolute and differential signal propagation delays and Doppler shifts measured from communication links between the user terminal and radio frequency (RF) sources, such as satellites.

BACKGROUND OF THE INVENTION

One approach to locating objects on the surface of the earth is the Global Position System (GPS). The GPS includes a constellation of satellites broadcasting predetermined transponder signals. Terrestrial-based GPS receivers can accurately compute their locations based on these transponder signals. Although GPS can provide accurate positioning information, its limitations make it impracticable in certain applications. For instance, using GPS in a mobile communications system to locate user terminals (UTs) has several disadvantages. First, GPS receivers are expensive. Requiring each UT in a communications system to include a GPS receiver would dramatically increase costs. Second, on cold-start power up, it often takes a GPS receiver several minutes to acquire its position. This lengthy acquisition time is impracticable in certain satellite mobile communications systems in which UT position determination should be performed at the beginning of a phone call without noticeable delay to the user.

Another approach, Qualcomm's Automatic Satellite position reporting used in its OmniTRACS product, determines the position of a user terminal on the surface of the earth using two geosynchronous satellites with the terminal measuring the absolute delay to one satellite, as well as the differential value between the delays to the two satellites. The absolute delay to the second satellite is obtained by adding the differential delay to the absolute delay to the first satellite. The position of the terminal can then be calculated from the two absolute delays and the known positions of the two satellites (with the assumption that the terminal is on the earth surface). There are two potential problems that make this approach inappropriate for certain satellite communications systems: 1) This approach does not provide high accuracy for low latitude regions (around the equator) due to geometric dilution of precision (GDOP) as explained later in this disclosure. This problem prevents the approach from being applicable to a system that is to provide global position determination service. 2) This approach requires that the differential delay measurement be made at the same instance of time as the absolute measurement is made or that the two satellites be stationary, to derive a meaningful second absolute delay. This requirement adds complexity to the terminal design in a system that employs fast moving satellites (with low or medium orbits). The requirement also lengthens the call setup time to a system in which position of a terminal must be acquired before a call.

A third approach to determining UT position relies on measured signal propagation delay and Doppler shift from the radio transmission link between a satellite and the UT. Typically, the propagation delay and Doppler shift are derived from a radio-frequency (RF) carrier transmitted between the UT and a moving transceiver, for example, an RF transceiver included on a moving airplane or satellite. The Doppler shift is a well known physical phenomenon and represents the observed change in frequency of the propagated RF wave that occurs due to the relative motion between the UT and the transceiver. The measured signal propagation delay is the amount of time required for an electromagnetic signal to travel between the UT and the moving transceiver. From this delay, it is easy to calculate the distance separating the UT and transceiver by multiplying the delay by the speed at which the electromagnetic signal travels, which is generally at or near the speed of light.

In the above one-satellite UT position determination method, a ground station can measure the propagation delay and Doppler of a communication link between the UT and a satellite. The ground station then calculates the UT position based on the measurements and the predetermined satellite position at the time of the measurement. As shown in FIG. 1, the measured values of propagation delay and Doppler can be conceptually mapped onto the surface of the earth, revealing UT locations corresponding to the measurements. Since propagation delay and Doppler measurements have inherent errors, each measurement is represented as a band along the corresponding contour. The intersecting areas of the two bands, which are shown cross-hatched, indicate regions where the UT can be located. The measurements by themselves typically give two possible areas where the UT can be located. The specific area actually containing the UT can be identified by additional information, such as the identification of the satellite spot beam servicing the UT.

Locating a UT using propagation delay and Doppler measurements from a single satellite communication link suffers from the intrinsic property of geometric dilution of precision (GDOP), meaning that if the UT is within certain areas on the surface of the earth relative to the satellite, the two measurements do not provide accurate positioning information.

This phenomenon is illustrated in FIG. 2 for a one-satellite method, which is a conceptual diagram showing a typical set of propagation delay contours and a typical set of Doppler shift contours on a portion of the surface of the earth visible to the satellite. The concentric circles represent propagation delays of constant values, and the quasi-hyperbolic curves represent constant Doppler shift values. The center of the concentric circles represents the sub-satellite point, which is the point on the earth directly below the orbiting satellite. The straight line represents the satellite ground track, which indicates the instantaneous direction of travel of the satellite relative to the surface of the earth.

The amount of error in a UT position estimated using a one-satellite method depends largely upon the location of the UT relative to the satellite. The GDOP is most pronounced on and near the ground track, where the estimated area in which the UT can reside elongates, significantly reducing the accuracy of the UT position estimate. Thus, for UTs near the ground track, the one-satellite locating method does not produce good estimates of UT positions. However, at locations away from the ground track, the areas defined by intersecting Doppler and delay bands shrink, indicating a more accurate estimate.

Accordingly, there is a need for a method and system that improves the accuracy of UT position determination by reducing the effect of GDOP.

SUMMARY OF THE INVENTION

It is an advantage of the present invention to provide a novel method and system for determining UT position based on absolute and differential signal delays and Doppler shifts measured from two or more satellites. The method and system disclosed herein is significantly faster, and provides for a less expensive terminal than conventional positioning techniques, such as GPS. In addition, the method and system of the present invention significantly reduces the problem of GDOP associated with locating techniques relying solely on absolute propagation delay and absolute Doppler measurements associated with the prior satellite methods discussed above. In the disclosed method and system, the terminal measures a differential delay and/or a differential Doppler shift. It should be appreciated that by having the terminal make such measurements, an efficient and cost effective approach is achieved with cheaper components than a terminal making measurements of absolute delay and Doppler. Moreover, rather than being used to derive some absolute values, the differential measurements are used directly without sacrificing precision allowing one differential measurement to be made at a time and the other differential measurement or the other absolute measurements to be made at another time.

According to an embodiment of the invention, a system for determining the location of the UT on the surface of the earth includes a large ground station and a plurality of orbiting satellites. The ground station tracks at least two of the satellites, providing satellite position and velocity information. The UT can measure a differential signal propagation delay and a differential Doppler shift of the electromagnetic signals transmitted from two of the satellites and report the measurement to the ground station. A processor, in communication with the ground station, performs an initial estimate of the UT location based on an absolute signal propagation delay and an absolute Doppler shift measured by the ground station from a communication link between the UT and one of the satellites. Based on the accuracy of the initial estimate, the processor can perform a second estimate of the UT location using the absolute propagation delay and Doppler shift, as well as the differential propagation delay and Doppler shift.

It will be understood that the foregoing general description and the following detailed description are exemplary and intended to provide further explanation of the invention as claimed. The accompanying drawings provide an understanding of the invention as described in the embodiments to illustrate the invention and serve to explain the principles of the invention.

DETAILED DESCRIPTION OF THE PREFERRED EMBODIMENTS

Figure 1:
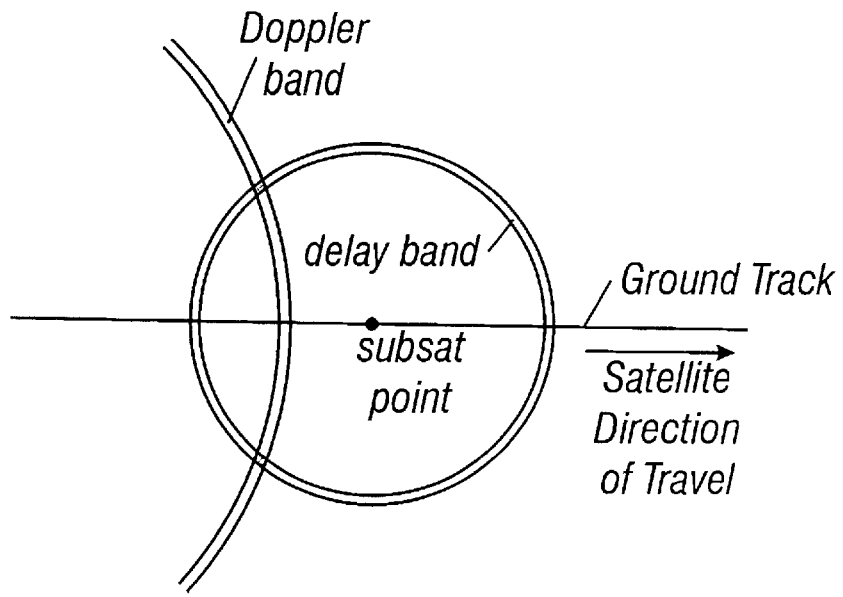
FIG. 1 is a conceptual diagram depicting measured propagation delay and Doppler shift bands of a satellite transmission mapped onto the earth's surface.
Figure 2:
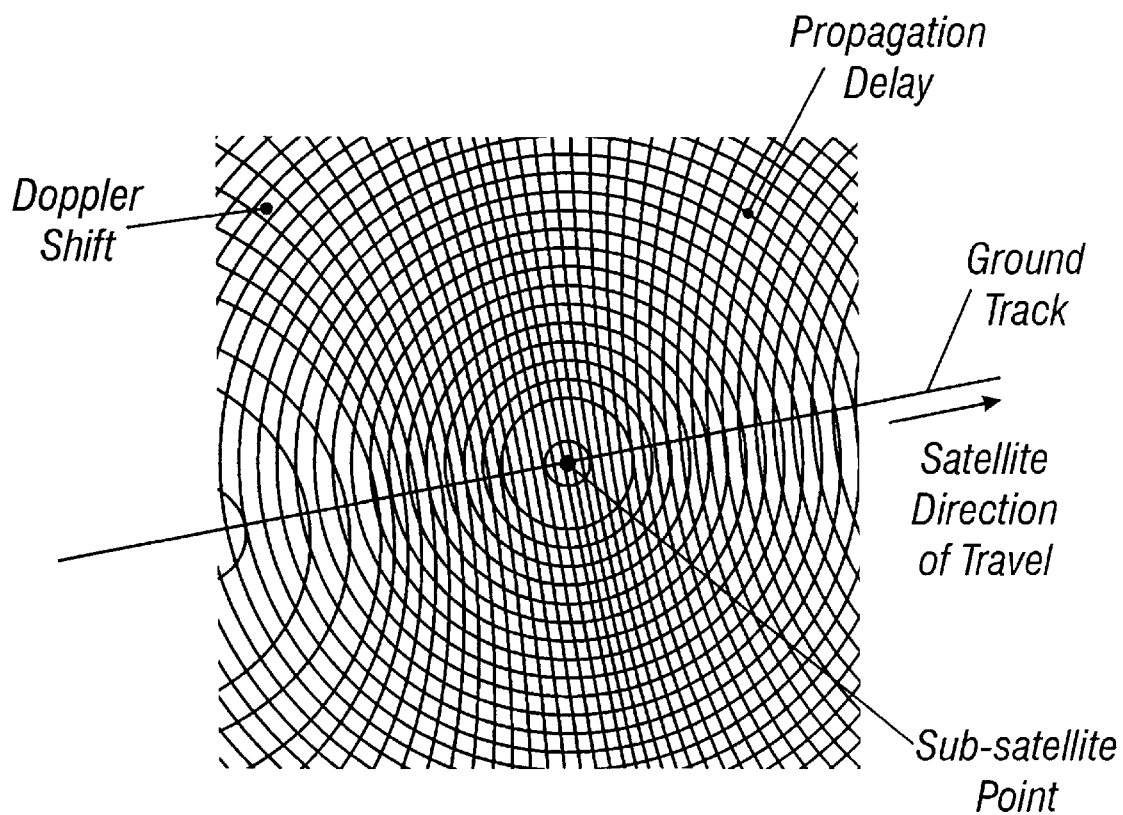
FIG. 2 is a conceptual diagram showing a set of propagation delay contours and a set of Doppler shift contours for a single satellite orbiting the earth.
Figure 3:
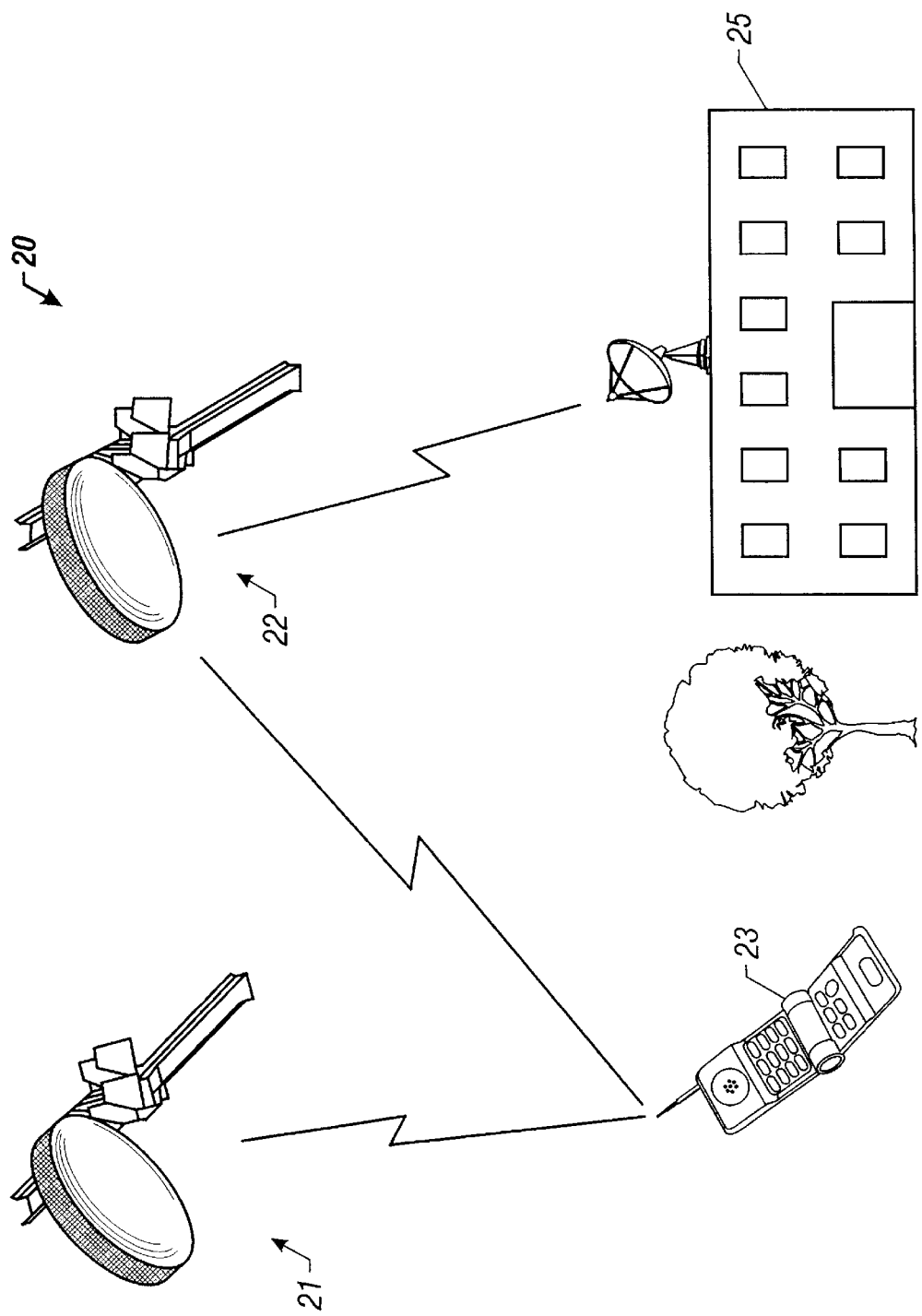
FIG. 3 is a diagram of a mobile communications system in accordance with an embodiment of the present invention.

Turning now to the drawings, and in particular to FIG. 3, a satellite communications system 20 in accordance with one embodiment of the invention is illustrated. The system 20 includes a plurality satellites 21–22, a terrestrial-based user terminal (UT) 23, and a ground station 25. The UT 23 and ground station 25 are in radio frequency (RF) communication with the satellites 21–22. The ground station 25 and UT 23 can communicate with one another via the RF communication links with one of the satellites 21–22.

The UT 23 can be a mobile handset or any other device suitable for satellite communications. A terrestrial-based UT can by any UT located on the earth's surface.

The satellites 21–22 can be communications satellites having phrased array antennas. The ground station 25 can include a subsystem for tracking the satellites' positions and velocities relative to a predetermined coordinate system, such as the earth-centered, earth-fixed (ECEF) coordinate system.

The satellite tracking can be accomplished using conventional techniques; and satellite positions and velocities can be obtained via real-time tracking or predicted from periodically tracked data. Well-established techniques of astrodynamics can be used to obtain data on the positions and velocities of the satellites 21–22.

Figure 4:
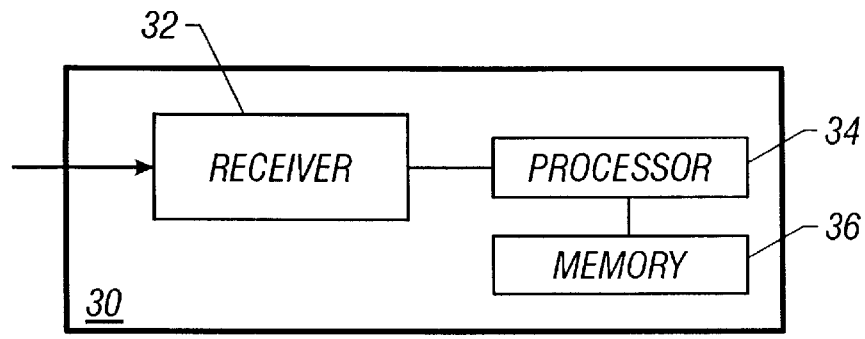
FIG. 4 is a block diagram of a position determination unit (PDU) included in the communications system of FIG. 3.

Referring now to FIG. 4, there is shown a position determination unit (PDU) 30 that includes a receiver 32, a processor 34 and a computer memory 36. The PDU 30 can be included in the ground station 25. However, the PDU 30 can alternatively be included in either the satellite 22, or in any other device in communication with the ground station 25 or satellite 22. Moreover, the structure of the PDU 30 illustrated in FIG. 4 is exemplary. One of ordinary skill in the art will readily appreciate that there are many equivalent structures suitable for performing the functions of the PDU 30, and further, that the various functions of the PDU 30 can be equivalently performed by distributed processors located throughout the communication system.

Turning now to the elements included in the exemplary PDU 30, the receiver 32 includes circuitry for converting RF signals received from the RF communication link into digital data suitable for use by the processor 34. The receiver 32 may include a conventional quadrature phase shift keying (QPSK) MODEM for satellite communications. In addition, the receiver 32 can determine a signal propagation delay and a Doppler shift of RF signals transmitted between the UT 23 and the satellite 22. Techniques for measuring propagation delay and Doppler shift of an RF carrier signal emitted from a satellite are well known. As in the present embodiment, the terminal measures a differential delay and/or a differential Doppler shift. It should be appreciated that by having the terminal make such measurements, an efficient and cost effective approach is achieved with cheaper components. The differential measurements of delay and Doppler may be more simply obtained than measurements of absolute delay and Doppler. Moreover, the differential measurements are used directly without sacrificing precision, thus allowing one differential measurement to be made at a time and the other differential measurement or the other absolute measurements to be made at another time.

In the described embodiment of the invention, the PDU 30 is included in a ground base station. The absolute delay and Doppler are measured by the ground station, while the differential delay and Doppler are measured by the UT 23. The absolute and differential measurements each correspond to some predetermined point in time. The differential measurements are transferred by the UT 23 to the ground station using normal communication channels. The UT position is then estimated by the ground station using the four measurements.

The position determination technique disclosed herein does not depend on how the path propagation delay and Doppler shift are obtained. Accordingly, these values can be measured from a carrier signal included in RE bursts transmitted between the UT 23 and ground station 25, by way of one of the satellites 21–22. The processor 34 can be any electronic device capable of performing computations using the data provided by the receiver 32. The processor 34 can include a general purpose computer, a microprocessor, a digital signal processor (DSP), an application specific integrated circuit (ASIC), or the like, configured to perform position determination as disclosed herein.

The memory 36 is computer-readable media that can store a set of executable instructions for directing the processor 34 to determine the position of the UT 23. The algorithm embodied by these instructions is depicted by the flowchart in FIGS. 5 and 6.

Figure 5:
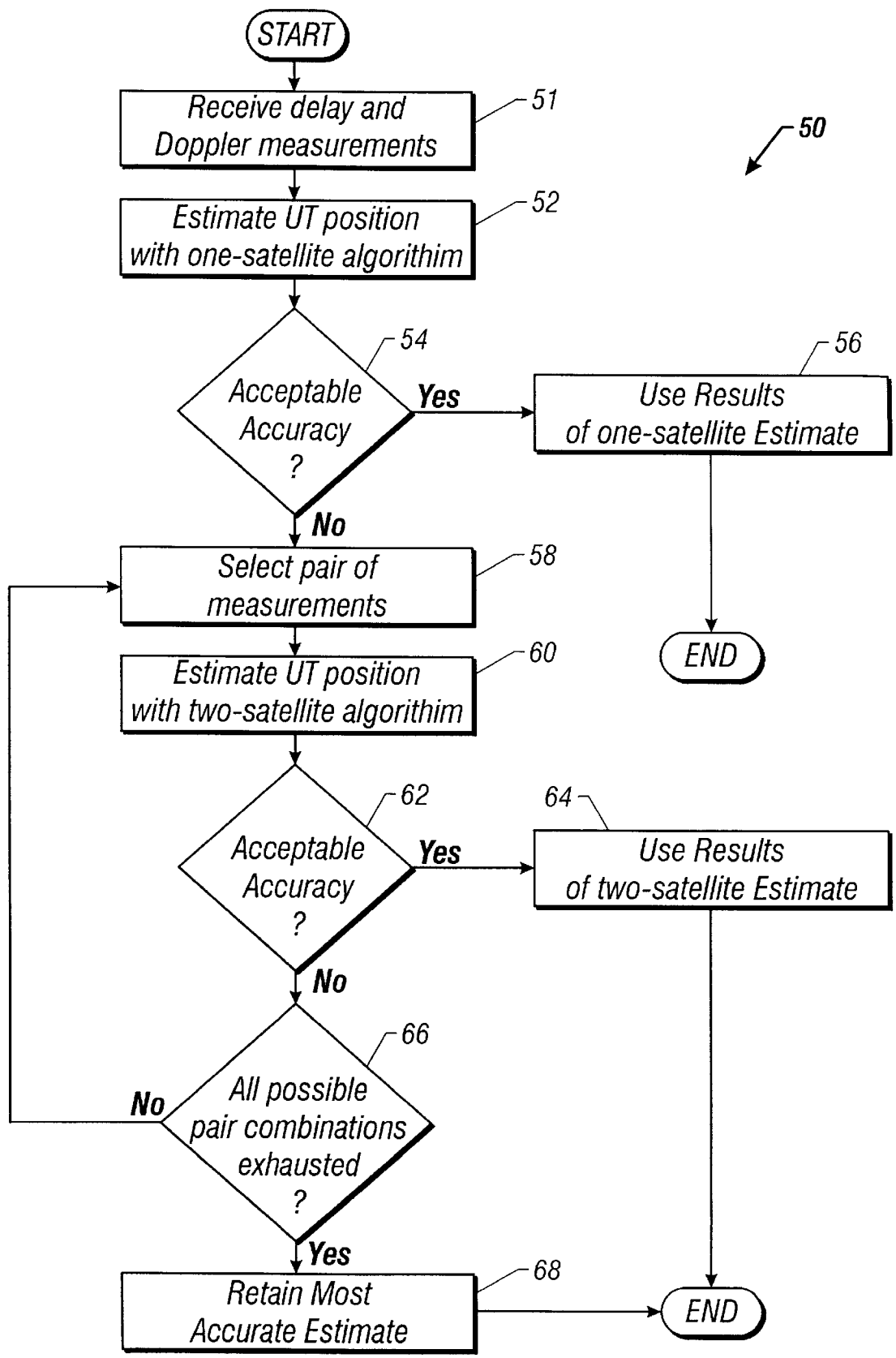
FIG. 5 is a flowchart diagram illustrating a method of locating a user terminal in accordance with an embodiment of the present invention.

FIG. 5 is a flow chart diagram illustrating a method 50 of locating a user terminal in accordance with an embodiment of the present invention. In step 51, the absolute and differential delay and Doppler measurements are received by the processor at the ground station. The absolute delay and Doppler can be measured by the ground station itself, while the differential delay and Doppler can be measured by the UT 23. In step 52, one-satellite UT position determination is performed, using the absolute delay and the absolute Doppler, to produce an initial estimate of the location of the UT. In step 54, a check is made to determine whether the accuracy of the initial estimate of the UT location is acceptable. If so, the results of the one-satellite algorithm are used as the UT location (step 56) and the two-satellite algorithm is not executed. Otherwise, if the one-satellite results are not acceptable, the method 50 proceeds to step 58, where a pair of measurements are selected to perform a second, refined estimate of the UT location using a two-satellite position determination algorithm. The four measurements form six possible pairs: (1) absolute delay and absolute Doppler, (2) absolute delay and differential Doppler, (3) absolute delay and differential delay, (4) differential delay and absolute Doppler, (5) absolute Doppler and differential Doppler, and (6) differential delay and differential Doppler. The UT position can be estimated from each pair. Each pair of measurements has its own GDOP phenomenon, but the six pairs complement one another for a particular spot on the surface of the earth. The first pair, absolute delay and absolute Doppler, is already used in the one-satellite algorithm, and need not be used in the two-satellite algorithm. The method 50 then proceeds to step 60, where a two-satellite position determination algorithm is executed. The details of the two-satellite algorithm are discussed below in connection with FIG. 6.

A check is then made to determine if the estimate of the two-satellite algorithm is acceptable (step 62). If so, the results of the two-satellite estimate are used as the UT position (step 64) and the method 50 terminates. However, if the accuracy of the estimate is not acceptable, a check is made to determine whether another pair of measurements is available to repeat the two-satellite estimate (step 66). If so, the method 50 returns to step 58 and the two-satellite algorithm is repeated for a different pair of measurements. If all possible pair combinations have already been used to perform the two-satellite estimate, the most accurate estimate is selected and retained as the final estimate of the UT position (step 68).

The accuracy checks made in steps 54 and 62 can be made by comparing an estimated positioning error to a predetermined error threshold. The estimated error can be computed for each measurement pair based on 1) the estimated error in each of the measurements, and 2) the gradients of equations representing the position, as will be discussed in greater detail in connection with FIG. 6. The estimated error of a measurement can be derived from the real-time signal to noise ratio of the signal(s) measured.

Figure 6:
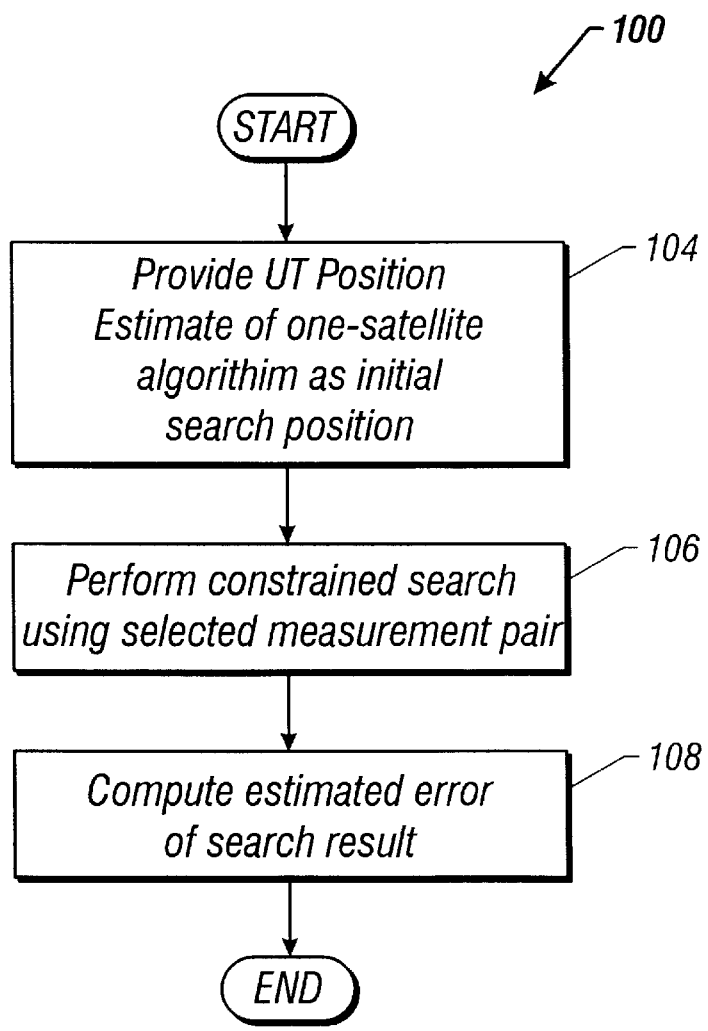
FIG. 6 is a flowchart diagram illustrating details of the two-satellite locating algorithm of FIG. 5 in accordance with an embodiment of the present invention.

Turning now to the two-satellite algorithm for position determination, FIG. 6 shows a flow chart diagram of a method 100 illustrating the steps of the two-satellite locating algorithm. In step 104, the results of the one-satellite algorithm are provided as an initial estimate of the UT position. This initial estimate may be generated, for example, using the method and apparatus as disclosed in co-pending application U.S. Ser. No. 09/212,528, filed Dec. 16, 1998, which is herein incorporated by reference. Using this initial estimate, a constrained search is performed using the selected measurements. As will be discussed below in further detail, the search is performed using general numerical methods, such as the Newton-Raphson method. The search can result in a UT position estimate that may be more accurate than the one-satellite method. Next, in step 108, the estimated error of the search result is computed. The error can be estimated using standard mathematical techniques that are based on the gradients of the mathematical functions that model the selected measurements.

The mathematical details of the method 100 shown in FIG. 6 are now provided. This invention makes use of the fact that the relationship between each of the four measurements and the UT position can be explicitly derived, given the known position(s) of the satellite(s) involved at time of measurement(s). Effectively, there are four equations in the form of:

$$\left. \begin{array}{l} M_1 = F_1(P) \\ M_2 = F_2(P) \\ M_3 = F_3(P) \\ M_4 = F_4(P) \end{array} \right\} \quad (1)$$

where each of $M_1$, $M_2$, $M_3$, and $M_4$ is one of the four measurements, P is the UT position, and each of $F_1$, $F_2$, $F_3$, and $F_4$ is the function describing the relationship of $M_1$, $M_2$, $M_3$, and $M_4$, respectively, to P. P can be solved for from any pair of equations above using well-established, general numerical methods such as the Newton-Raphson method. The angle between the contours of, say $F_1$ and $F_2$, can be calculated from the gradients of the two functions.

As with the one-satellite method, the contours corresponding to each pair of measurements generally have two intersections. To avoid the need for finding two solutions, which is very difficult for general equations and a general numerical method, this invention first uses the one-satellite method (using the absolute delay and absolute Doppler pair) to locate the UT to within 500 km and then selects the best pair of measurements to refine the position estimate. The best pair will have the most orthogonal contours and have only one intersection within the 500 km perimeter. This approach of using one-satellite method to arrive at an initial guess and a search region is better than using the beam from which the UT sends signals as the search region, because the beam may be much larger than a 500 km radius circle and the best pair of measurements may not correspond to only one intersection in the beam.

The described embodiment of the invention is as follows. Let S and P respectively be the vectors representing the positions of a satellite and a UT in some convenient coordinate system, such as the Earth-Centered-Earth-Fixed (ECEF) coordinate system. The ECEF coordinate system is a 3-dimensional, right-handed Cartesian coordinate system whose z-axis coincides with the earth rotational axis and goes from south to north. Its x-axis lies in the equatorial plane and goes from the earth center towards and through the Greenwich meridian. The y-axis lies in the equatorial plane, goes through earth center, and is perpendicular to both the z-axis and the x-axis. Let S' and P', respectively be the vectors representing the velocity of the satellite and the UT. The delay Td and Doppler Fd of a communications link between the satellite and the UT are, respectively:

$$Td = \frac{|S-P|}{c}, \quad (2)$$

$$Fd = -\frac{S-P}{|S-P|} \cdot (S' - P')\frac{F}{c}, \quad (3)$$

where c is the speed of light, F the carrier base frequency of the communications link, and · the dot-product operator.

If we assume that the UT is stationary on the surface of the earth, then the velocity P' of the UT is zero in ECEF.

Let Td, Fd, ΔTd, and ΔFd respectively represent the measurement of delay, Doppler, differential delay, and differential Doppler. Equation 1 now becomes:

$$Td = \frac{|S-P|}{c} \quad (4)$$

$$Fd = -\frac{S-P}{|S-P|} \cdot S'\frac{F}{c}$$

$$\Delta Td = \frac{|S_1 - P|}{c} - \frac{|S_2 - P|}{c}$$

$$\Delta Fd = -\frac{S_1 - P}{|S_1 - P|} \cdot S'_1 \frac{F_1}{c} + \frac{S_2 - P}{|S_2 - P|} \cdot S'_2 \frac{F_2}{c}$$

where S is the position of the satellite through which Td and Fd are measured, S' the velocity of the satellite; $S_1$ and $S_2$ are the positions of the satellites between which ΔTd and ΔFd are measured, and $S_1'$ and $S_2'$ the velocity of the two satellites respectively. $F_1$, and $F_2$ are, respectively, the carrier frequencies that the two satellites use to broadcast signals. The satellite positions and velocity are known based upon the time instances that the four measurements are made. Note that Equation 4 merely consists of multiple instances of Equations 2–3.

Any two of the four equations in Equation 4 can be used to solve for UT position P using well-established numerical procedures such as the Newton-Raphson method. The error of the estimated position can be calculated from the angle between the gradients of the two equations using well-known, simple, numerical methods.

User terminal position determination is a two-dimensional root-finding problem. Given two measurements, each representing a contour on the surface of the earth, the intersection of the two contours is the UT location.

The Newton-Raphson method requires an initial guess at a root to begin with. The one-satellite algorithm produces an initial guess. Newton-Raphson does not always converge to a root Fortunately, divergence does not occur for a good pair of measurements, a pair whose contours are not nearly parallel. We create a circular region centered at the initial guess and use the region as a constraint to confine the search by Newton-Raphson. If the search goes beyond the constraint region, we know the pair of measurements happen to be bad and we quit the search, and set the estimated error for using the selected pair of measurements to be a large value.

To perform Newton-Raphson search or any other method of search on the surface of earth, it is necessary to represent or parameterize a (vector) variable point on the surface in two scaler variables. It is advantageous to use two scaler variables that have simple, straightforward geometric meanings so that the position error of the search result is easy to compute.

Figure 7A:
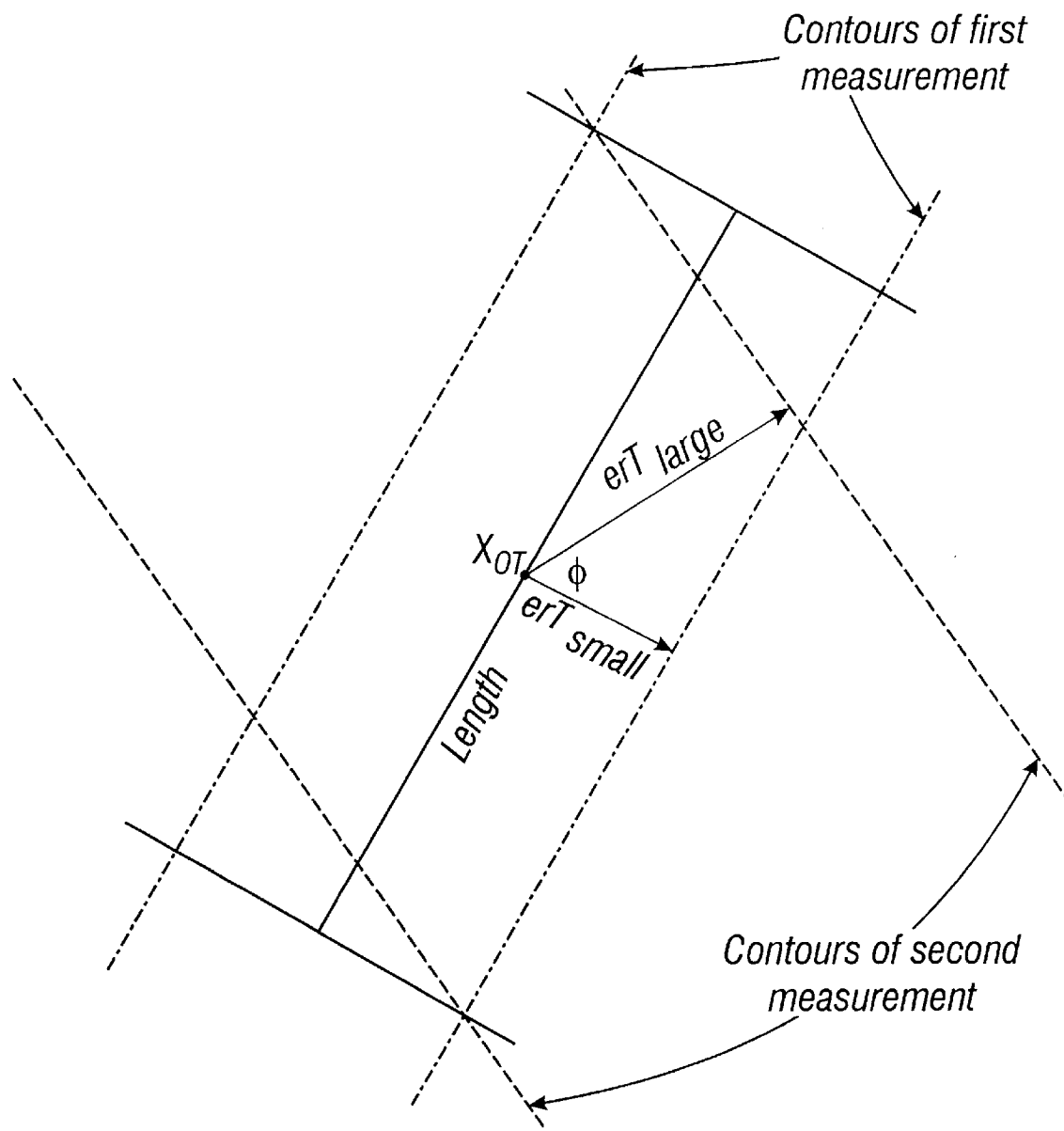
FIG. 7A shows a parallelogram region illustrating the measure of error associated with the estimated UT position.
Figure 7B:
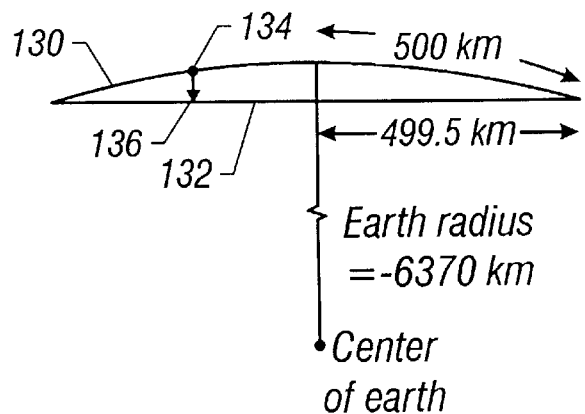
FIG. 7B is a diagram illustrating a planar approximation of a portion of the earth's surface.

As illustrated in FIG. 7B, a circular local region of the earth surface around the initial guess of UT position forms a cap 130. We map a point 134 on the cap to a point 136 in the plane 132 as shown in FIG. 7B, and use a Cartesian coordinate system in the plane to represent point 136. The orientation of the Cartesian coordinate system is shown in FIG. 7C which is a 3-dimensional perspective view of the earth.

Figure 7C:
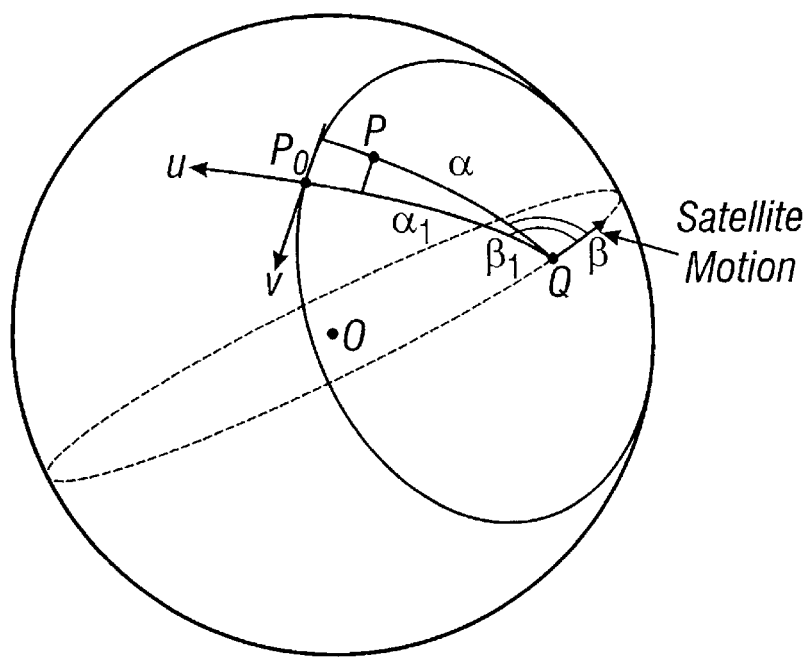
FIG. 7C shows the Cartesian coordinate system used in the Newton-Raphson search techniques employed.

In FIG. 7C point $P_0$ is the initial guess of UT position, point Q is the subsatellite point of the satellite through which the one-satellite method is performed to arrive at the initial guess. Point Q is easily obtained once the satellite position is known as follows. Let S be the vector representing satellite position in ECEF. The vector Q representing subsatellite point is $$Q = \frac{S}{|S|}R,$$

where R is the earth radius at the subsatellite point.

Point $P_0$ can be represented by two angles $\alpha_0$ and $\beta_0$ where $\alpha_0$ is the great arc separating $P_0$ and Q, and $\beta_0$ is the azimuth of $P_0$ relative to the satellte motion direction in an inertial space. Both of these two angles are easily calculated once $P_0$, Q, and satellite inertial velocity S' are known. (In fact, the one satellite method produces the two angles to represent the estimated UT position.) The Cartesian coordinate system consists of two perpendicular axes u and v. The u axis is the α increasing direction (away from sub-satellite point) and the v axis is the β increasing direction.

Given a point P 136=(u, v) in plane 132, the corresponding point 134 on the cap 130 can be calculated as follows in the form of two angles α and β shown in FIG. 7C.

Algorithm A

Input:    $P_0 = (\alpha_0, \beta_0)$    initial guess of the UT position, origin of Cartesian coordinate system

| | | |
|---|---|---|
| | $U = (u, v)$ | A point 136 in plane 132 in Cartesian coordinate format |
| Output: | $P = (\alpha, \beta)$ | In $(\alpha, \beta)$ format, a point 134 in cap 130 corresponding to point 136 |

Procedure:

$$\psi_u = \alpha_0 + \frac{u}{R}; \quad \psi_v = \frac{v}{R};$$

$$\alpha = \arccos(\cos\psi_u \cos\psi_v); \quad /* \alpha < \frac{\pi}{2} */$$

$$\beta = \beta_0 + \arcsin\left(\frac{\sin\psi_v}{\sin\alpha}\right);$$

Equations (4) are easy to evaluate in a 3-dimensional Cartesian coordinate system such as ECEF. We transform the $(\alpha,\beta)$ format representation of a point 134 on the surface of earth to its corresponding ECEF representation as follows:

In the above, x is the cross-product operator. $P_{ref}$, $\alpha_{ref}$, and $\beta_{ref}$ are auxiliary variables. The idea of the above transformation is as follows.

Given $\alpha$ and $\beta$, it is easy to work out the coordinates of P if the coordinate system we use is such that the subsatellite Algorithm B

| | | |
|---|---|---|
| Input: | $(\alpha, \beta)$ | In $(\alpha, \beta)$ format, a point 134 in cap 130 (surface of earth) |
| | $S = (x_s, y_s, z_s)$ | Satellite position in *ECEF* |
| | $S' = (x'_s, y'_s, z'_s)$ | Satellite velocity in inertial space and expressed in *ECEF* |
| | $R$ | Radius of earth at point *P* |
| Output: | $P = (x, y, z)$ | In *ECEF* format, a point 134 in cap 130 (surface of earth) |

Procedure:

1. $Q' = S \times S' \times S$  /* direction of satellite velocity component tangent to subsatellite point */

2. $$\begin{cases} \sin Ls = \dfrac{z_s}{\sqrt{x_s^2 + y_s^2 + z_s^2}} \\ \cos Ls = \dfrac{\sqrt{x_s^2 + y_s^2}}{\sqrt{x_s^2 + y_s^2 + z_s^2}} \\ \sin ls = \dfrac{y_s}{\sqrt{x_s^2 + y_s^2}} \\ \cos ls = \dfrac{x_s}{\sqrt{x_s^2 + y_s^2}} \end{cases}$$  /* latitude and longitude of satellite */

3. $P_{ref} = \begin{bmatrix} \cos Ls & 0 & \sin Ls \\ 0 & 1 & 0 \\ -\sin Ls & 0 & \cos Ls \end{bmatrix} \begin{bmatrix} \cos ls & \sin ls & 0 \\ -\sin ls & \cos ls & 0 \\ 0 & 0 & 1 \end{bmatrix} Q'$  /* $\beta = 0$ reference vector */

4. $$\begin{cases} \cos\beta_{ref} = \dfrac{y_{P_{ref}}}{\sqrt{y_{P_{ref}}^2 + z_{P_{ref}}^2}} \\ \sin\beta_{ref} = \dfrac{z_{P_{ref}}}{\sqrt{y_{P_{ref}}^2 + z_{P_{ref}}^2}} \end{cases}$$  /* $\beta = 0$ reference direction */

5. $P = \begin{bmatrix} \cos ls & -\sin ls & 0 \\ \sin ls & \cos ls & 0 \\ 0 & 0 & 1 \end{bmatrix} \begin{bmatrix} \cos Ls & 0 & -\sin Ls \\ 0 & 1 & 0 \\ \sin Ls & 0 & \cos Ls \end{bmatrix} \begin{bmatrix} 1 & 0 & 0 \\ 0 & \cos\beta_{ref} & -\sin\beta_{ref} \\ 0 & \sin\beta_{ref} & \cos\beta_{ref} \end{bmatrix} \begin{bmatrix} \cos\alpha \\ \sin\alpha\cos\beta \\ \sin\alpha\sin\beta \end{bmatrix} R$ point is on the x-axis and the satellite inertial velocity vector lies in the x-y plane (meaning the satellite orbit lies in the x-y plane). The second condition arises from the fact that the angle β is referenced from the direction of satellite motion in an inertial space. We call this coordinate system the desired coordinate system. We first conceptually rotate the ECEF coordinate system by the satellite latitude and longitude to move the subsatellite point onto the x-axis. We then calculate $P_{ref}$, the component of satellite inertial velocity tangent to the subsatellite point in the resulting conceptual coordinate system. From $P_{ref}$ we calculate the angle $β_{ref}$ that the resulting conceptual coordinate system needs to be further rotated around the x-axis to obtain the desired coordinate system. We then form the coordinates of P in the desired coordinate system and then rotate P three times in reverse order by the three conceptual rotations mentioned above to obtain P in ECEF coordinate system.

Step 1 in Algorithm B calculates, in ECEF, the component Q' of satellite velocity tangent to subsatellite point. Step 2 calculates the sinusoids of satellite latitude and longitude. Step 3 calculates $P_{ref}$ by rotating Q' by satellite longitude and latitude. Step 4 calculates the sinusoids of angle $β_{ref}$ from $P_{ref}$. Step 5, reading from right to left, forms P in the desired coordinate system (earth radius multiplied to the vector), rotates P by $β_{ref}$, by satellite latitude, and by satellite longitude, to obtain P in ECEF.

We have now completed the parameterization of a point 134 on the earth surface 130 by a point 136 in plane 132. The search logic goes as follows: the Newton-Raphson procedure examines a point 136 in plane 132 and determines if the corresponding point 134 on the earth surface 130 is sufficiently close to the true UT position. If not, Newton-Raphson selects another point in plane 132 and try again. Each time Newton-Raphson procedure evaluates one of the modeling equations in (4), it first performs algorithms A and B in sequence, and then applies the equation.

```
Algorithm Newton-Raphson
Input:              SearchRadius  radius of search region
                                  centered at X₀
                    f(U)          f(U) = 0 is the modeling equation
                                  of the first measurement
                    g(U)          g(U) = 0 is the modeling equation
                                  of the second measurement
Output:             P = (x, y, z) estimated UT position in ECEF
                    err           estimated position error
Procedure:
U_UT = 0;

While (|f(U_UT)| > tolerance_f or |g(U_UT)| > tolerance_g)
{
        ⎡ ∂f(U)  ∂f(U) ⎤
        ⎢  ∂u     ∂v   ⎥
    J = ⎢              ⎥
        ⎢ ∂g(U)  ∂g(U) ⎥
        ⎣  ∂u     ∂v   ⎦ |U=U_UT solve J·ΔU = -⎡f(U_UT)⎤  for ΔU;
                  ⎣g(U_UT)⎦
                                               /*this is a 2 by 2 linear system*/

If (|U₀ - (U_UT + ΔU)| > SearchRadius)
    { err = SearchRadius
      map U_UT to P = (x, y, z)
      return (U_UT, err);
                                               /*fail to converge, exit with
                                                  SearchRadius as err*/
    }
    U_UT = U_UT + ΔU;
}
calculate err;                                 /*see pseudo code below*/
map U_UT to P = (x, y, z)
return (P, err)
```

In the above pseudo code, $tolerance_f$ and $tolerance_g$ control the search accuracy to be achieved. Their values are dependent upon performance requirement of the system in which this method is to apply. As an example, they may have a value of 0.5 μsec for a time measurement equation or 0.5 Hz for a frequency measurement equation. J is the Jacobian matrix of f(U) and g(U), which consists of four partial derivatives that can be calculated using simple, one-sided numerical difference as in Equation 5. For the level of accuracy of measurements than certain systems can achieve, one sided difference is sufficient Otherwise, two-sided difference can be used.

$$\frac{\partial f(U)}{\partial u} \approx \frac{f\left(U + \begin{bmatrix} \Delta u \\ 0 \end{bmatrix}\right) - f(U)}{\Delta u} \tag{5}$$

-continued $$\frac{\partial f(U)}{\partial v} \approx \frac{f\left(U + \begin{bmatrix} 0 \\ \Delta v \end{bmatrix}\right) - f(U)}{\Delta v}$$

Equation 5 involves evaluating modeling equations (4), and Algorithms A and B need to be performed first to obtain the ECEF representation of the point on earth surface 130 corresponding to point U in plane 132.

For Algorithm Newton-Raphson, $\Delta u$ and $\Delta v$ can be on order of 1 to 50 km. A good practice is to have $\Delta u$ and $\Delta v$ start with, say 50 km, and decrease by 50% with each iteration until reaching 1 km where they will stay.

It is straightforward to estimate the position error in an estimated UT position obtained from Algorithm Newton-Raphson. In a local earth surface region with a size of any possible position error (definitely smaller than a few hundred kilometers), the contours of the two measurements are nearly straight lines. Given the estimated measurement errors and the gradients of the two modeling equations for the two measurements, the UT can be placed in a parallelogram region as shown in FIG. 7A. The length of the parallelogram is a good measure of the error associated with the estimated UT position. The following algorithm calculates the position error. Instead of estimating the position error on the earth surface, the algorithm estimates position error in the plane 132 for simplicity. FIG. 7B shows that the error introduced by this approximation in estimating position error is small.

Algorithm C

Input:
- $U_{UT} = (u_{UT}, v_{UT})$    The point in plane 132 corresponding to the estimated UT position
- $f(U)$    $f(U) = 0$ is the modeling equation of the first measurement
- $g(U)$    $g(U) = 0$ is the modeling equation of the second measurement
- $errf$    estimated error in the first measurement
- $errg$    estimated error in the second measurement Output:    $err$    length of rectangular error region associated with $P$ Procedure:

$$\nabla f = \left(\frac{\partial f(U)}{\partial u}, \frac{\partial f(U)}{\partial v}\right)\bigg|_{U=U_{UT}}; \quad /\ast \text{gradient of } f(U) \text{ at } U_{UT} \ast /$$

$$\nabla g = \left(\frac{\partial g(U)}{\partial u}, \frac{\partial g(U)}{\partial v}\right)\bigg|_{U=U_{UT}};$$

$$errf_{UT} = \frac{errf}{|\nabla f|}; \quad /\ast \text{position error in the } f(U) \text{ gradient direction} \ast /$$

$$errg_{UT} = \frac{errg}{|\nabla g|};$$

if $(errf_{UT} < errg_{UT})$
{
$\nabla_{small} = \nabla f; \nabla_{large} = \nabla g;$
$errf_{small} = errf_{UT}; errf_{large} = errg_{UT};$
}
else
{
$\nabla_{small} = \nabla g; \nabla_{large} = \nabla f;$
$errf_{small} = errg_{UT}; errf_{large} = errf_{UT};$
}

$$\varphi = \arccos \frac{\nabla_{small} \cdot \nabla_{large}}{|\nabla_{small}||\nabla_{large}|}; \quad /\ast \varphi: \text{acute angle between the two gradients} \ast /$$

$$err = 2\left(\frac{err_{small}}{\tan\varphi} + \frac{err_{large}}{\sin\varphi}\right); \quad /\ast \text{length of the rectangle enclosing the error region} \ast /$$

return $err$;

FIG. 7A illustrates the calculation of err defined as the length of the rectangle enclosing the error region.

It should be appreciated that a wide range of changes and modifications may be made to the embodiments of the invention as described herein. Thus, it is intended that the foregoing detailed description be regarded as illustrative than limiting and that the following claims, including all equivalents, are intended to define the scope of the invention.

What is claimed is:

1. A method of locating a terrestrial-based user terminal by referencing a plurality of satellites orbiting the earth, comprising:

performing an initial estimate of a user terminal location using an absolute signal propagation delay and an absolute Doppler shift derived from a communication link between the user terminal and one of the satellites; and performing a second estimate of the user terminal location based on the absolute signal propagation delay, the absolute Doppler shift, a differential signal propagation delay and a differential Doppler shift, the differential measurements being made from communication links between the user terminal and at least two of the satellites.

2. The method of claim 1, further comprising:

performing the second estimate based on the initial estimate of the user terminal location.

3. The method of claim 1, further comprising:

parameterizing a region of the earth's surface by a plane to perform the second estimate.

4. The method of claim 1, further comprising:

selecting a pair of measurements for the second estimate, the measurements being selected from the group consisting of the absolute signal propagation delay, the absolute Doppler Shift, the differential signal propagation delay and the differential Doppler shift.

5. The method of claim 4, wherein the pair of measurements is selected as a function of the initial estimate of the user terminal location.

6. A method of locating a terrestrial-based user terminal, comprising:

estimating a user terminal location using an absolute signal propagation delay and an absolute Doppler shift measured from a communication link between the user terminal and a satellite;

estimating position error based on the estimated user terminal location and the measurement errors; and performing a second estimate of the user terminal location based on the estimated position error, the second estimate being a function of a pair of signals selected from the group consisting of the absolute signal propagation delay, the absolute Doppler shift, a differential signal propagation delay, and a differential Doppler shift, the differential signal propagation delay and the differential Doppler shift being measured from communication links between the user terminal and at least two satellites.

7. A method of locating a terrestrial-based user terminal in a communications system employing a plurality of satellites orbiting the earth, comprising:

placing a call from a terrestrial-based user terminal, the call being routed through the communications system, which in response to the call, estimates a location of the user terminal by performing an initial estimate of the location based on an absolute signal propagation delay and an absolute Doppler shift derived from a communication link between the user terminal and one of the satellites, the system then estimating location error based on the initial estimate of the location and the measurement errors and performing a second estimate of the location based on the estimated position error, the second estimate being a function of a pair of measurements selected from the group consisting of the absolute signal propagation delay, the absolute Doppler shift, a differential signal propagation delay and a differential Doppler shift, the differential signal propagation delay and the differential Doppler shift being measured from communication links between the user terminal and at least two of the satellites.

8. A system for locating a terrestrial-based user terminal, comprising:

a plurality of satellites orbiting the earth;

a ground station for tracking the satellites;

a user terminal operable to measure differential signal propagation delay and differential Doppler shift from a plurality of signals transmitted from the satellites to the user terminal, the measurement of the differential signal propagation delay and the differential Doppler shift being made from communication links between the user terminal and at least two of the satellites; and a processor, in communication with the ground station and user terminal, for performing an initial estimate of a user terminal location based on an absolute signal propagation delay and an absolute Doppler shift measured from a communication link between the user terminal and one of the satellites, and for performing a second estimate of the user terminal location constrained by the initial estimate and based on the absolute signal propagation delay, the absolute Doppler shift, the differential signal propagation delay and the differential Doppler shift.

9. An apparatus for locating a terrestrial-based user terminal comprising:

means for estimating a user terminal location using an absolute signal propagation delay and absolute Doppler shift measured from a communications link between the user terminal and a satellite;

means for estimating error based on the estimated user terminal location and the measurement errors; and means for performing a second estimate of the user terminal location based on the estimated position error, the second estimate being a function of a pair of measurements selected from the group consisting of the absolute signal propagation delay, the absolute Doppler shift, a differential signal propagation delay and a differential Doppler shift, the differential signal propagation delay and the differential Doppler shift being measured from communication links between the user terminal and at least two satellites.

* * * * *